United States Patent [19]
Kato et al.

[11] Patent Number: 5,998,339
[45] Date of Patent: Dec. 7, 1999

[54] WET TYPE SLIDING APPARATUS COMPRISING RADIAL BEARING

[75] Inventors: Eiji Kato; Shoji Yasunaga; Hidehiko Tamura; Tadashi Tanaka, all of Nagoya, Japan

[73] Assignee: Daido Metal Company Ltd., Nagoya, Japan

[21] Appl. No.: 08/946,232

[22] Filed: Oct. 7, 1997

[30] Foreign Application Priority Data

Jan. 22, 1997 [JP] Japan .................................. 9-024266

[51] Int. Cl.⁶ .............................. F16C 33/00; C08L 71/00
[52] U.S. Cl. ........................................... 508/106; 508/109
[58] Field of Search ............................................ 508/106

[56] References Cited

U.S. PATENT DOCUMENTS

| | | | |
|---|---|---|---|
| Re. 32,595 | 2/1988 | Davies .................................. | 156/308.2 |
| 3,453,208 | 7/1969 | Gallagher et al. ..................... | 508/106 |
| 3,781,205 | 12/1973 | Cairns et al. .......................... | 508/106 |
| 3,879,301 | 4/1975 | Cairns .................................... | 508/106 |
| 3,980,570 | 9/1976 | Okuda et al. .......................... | 508/106 |
| 4,080,233 | 3/1978 | McCloskey et al. .................. | 156/212 |
| 4,333,977 | 6/1982 | Abrahams et al. .................... | 428/131 |
| 4,421,588 | 12/1983 | Davies .................................. | 156/308.2 |
| 4,532,054 | 7/1985 | Johnson ................................. | 508/106 |
| 4,655,944 | 4/1987 | Mori ...................................... | 508/106 |
| 4,724,251 | 2/1988 | Rock ...................................... | 525/104 |
| 5,091,098 | 2/1992 | Tanaka et al. ......................... | 508/106 |
| 5,131,827 | 7/1992 | Tasaka .................................. | 418/55.2 |
| 5,486,299 | 1/1996 | Fuwa et al. ........................... | 508/106 |
| 5,726,232 | 3/1998 | Egami et al. ......................... | 524/414 |

FOREIGN PATENT DOCUMENTS

| | | |
|---|---|---|
| 58-160346 | 9/1983 | Japan . |
| 2 079 867 | 1/1982 | United Kingdom . |
| 2313632 | 12/1997 | United Kingdom . |

*Primary Examiner*—Ellen M. McAvoy
*Attorney, Agent, or Firm*—Browdy and Neimark

[57] ABSTRACT

A wet type sliding apparatus comprising a wet type radial bearing which starts in the presence of a lubricating liquid, wherein the radial bearing has a sliding surface consisting of a resin composition comprising 10 to 45% by weight of a carbon fiber and 0.1 to 8.5% by weight of a fluorocarbon polymer, the balance being substantially an aromatic polyetherketone resin or a polyarylene sulfide resin. The radial bearing in the above wet type sliding apparatus is excellent in wear resistance even under a high load.

20 Claims, 7 Drawing Sheets

WET TYPE SLIDING APPARATUS COMPRISING RADIAL BEARING

BACKGROUND OF THE INVENTION

This invention relates to a wet type sliding apparatus, more particularly to a wet type sliding apparatus comprising a wet type radial bearing excellent in wear resistance which bearing is used under high load conditions in the presence of a lubricating liquid (lubricating oil or lubricating water). Such a wet type sliding apparatus includes various ones such as generator, pump, marine engine and the like. This invention has improved such a wet type sliding apparatus by use of a radial bearing having a specific sliding surface.

As a material for the above radial bearing, there have heretofore been known white metal, a composite material of polytetrafluoroethylene (PTFE) and a glass fiber, polyethersulfone (PES) and the like.

Aromatic polyetherketone resins are known as engineering resins having excellent heat resistance, mechanical properties and wear resistance, and UK Patent No. 2,079,867 discloses a bearing in which polyetheretherketone (PEEK) is used as the sliding member.

However, the aromatic polyetherketone resin per se has a high friction coefficient, so that sliding members having a lower friction coefficient have heretofore been developed by using the aromatic polyetherketone resin as a base material and adding thereto a resin such as a fluorocarbon polymer or the like. On the other hand, however, this development results in a deterioration of wear resistance and mechanical strength because the fluorocarbon polymer is contained.

As a technique relating to these aromatic polyetherketone resins, the technique disclosed in JP-A 58 (1983)-160,346 is known though it relates to a dry type sliding member.

In this prior technique, as a sliding member of a dry type sliding apparatus in which no lubricating liquid is used, there is stated a resin composition comprising a thermoplastic aromatic polyetherketone resin as a base material, 2.5 to 60% by weight of a polytetrafluoroethylene (PTFE) and 2.5 to 60% by weight of a carbon fiber. However, the composition range in which the practical heat distortion temperature (HDT) and limiting PV value have been actually confirmed is only 10 to 40% by weight of a fluorocarbon polymer (polytetrafluoroethylene) and 10 to 40% by weight of a carbon fiber. When a composition of 2% by weight of a fluorocarbon polymer and 18% by weight of a carbon fiber is used in the bearing of a copying machine, it has been confirmed that a creak is generated and the revolution becomes unusual (see Comparative Example 3 in the above prior art reference), and it is suggested that the amount of the fluorocarbon polymer becoming small is not desirable.

Moreover, polyarylene sulfide resins are known as engineering resins excellent in heat resistance, mechanical properties and wear resistance. However, similarly to the aromatic polyetherketone resins, the polyarylene sulfide resins per se have a high friction coefficient and have been considered to be difficult to apply to a sliding member.

Recently, the area of the sliding surface of a radial bearing which starts in the presence of a lubricating liquid and which is incorporated into an apparatus such as a generator, a pump or the like, has been made small accompanying the tendency of miniaturization of the apparatus, and a higher surface pressure has come to apply to the sliding surface. The radial bearing which is applied under such severe conditions has been required to have wear resistance in addition to excellent sliding characteristics under wet lubrication.

Furthermore, in the case of the wet type radial bearing in which starting and stopping are repeatedly effected, only a small amount of a lubricating liquid is present at the time of the starting and the sliding surface of the bearing is partially in solid contact, so that not only does a large starting power become necessary, but also, there is a fear that the sliding surface is damaged by the solid contact. Therefore, in addition to the wear resistance during the operation, it is required that the friction coefficient at the time of the starting should be small. The wear resistance in the wet type system should be such that the wear is 4 $\mu$m or less, particularly preferably 2 $\mu$m or less as determined by a change in thickness of test sample before and after a test in which a counter member is rotated for 30 seconds in an oil bath by, for example, a friction and wear testing machine and then stopped for 300 seconds and this cycle is repeated 15 times (see Table 7 which appears hereinafter).

However, in the case of a sliding member in which white metal is used, a damage by solid contact tends to be caused at the time of the starting, and in the case of a sliding member in which PES is used, there has such a problem that it tends to be deteriorated by reaction with a lubricating oil and is lacking in durability. Moreover, a sliding member consisting of a composite material of PTFE and a glass fiber has such a problem that the mechanical strength is small and distortion tends to be caused.

In addition, the wear resistance and mechanical properties stated as to 10 to 40% by weight of a fluorocarbon polymer (polytetrafluoroethylene) and 10 to 40% by weight of a carbon fiber which are the ranges of the best mode of the above-mentioned prior art relating to the dry type technique have not been said to be sufficient. Moreover, as discussed above, in Comparative Example 3 of the above-mentioned prior art reference, it has been confirmed that when a composition consisting of 2% by weight of a fluorocarbon polymer and 18% by weight of a carbon fiber is used in the bearing of a copying machine, a creak is generated and the rotation becomes unusual, and it is stated that when the amount of the fluorocarbon polymer is 2% by weight, the composition is inappropriate as a sliding member. Furthermore, in the dry type prior technique, when the amount of PTFE is less than 10% by weight, no sufficient lubricity is actually obtained.

SUMMARY OF THE INVENTION

The present inventors have made research on the above-mentioned problems and have consequently found that the wear resistance of the sliding member of a radial bearing, particularly a sliding member which undergoes a high load, which starts in the presence of a lubricating liquid, is enhanced by adding a carbon fiber to an aromatic polyetherketone resin or a polyarylene sulfide resin and further adding thereto a fluorocarbon polymer. It has also been found that when the content of the fluorocarbon polymer is about 2% by weight, the wear resistance becomes the maximum, and as the amount is further increased the wear resistance is rather lowered and when the amount exceeds 10% by weight, the wear resistance is little varied. This invention has achieved the object of reducing the wear of the wet type radial bearing in such a composition range that in the dry system, no sufficient characteristics can be exerted.

It has also been found that in the case of a sliding member for radial bearing obtained by adding a carbon fiber and a fluorocarbon polymer to an aromatic polyetherketone resin or a polyarylene sulfide resin and also mixing therewith a graphite having an oil absorption of 70 to 500 ml per 100 g, the wear resistance is enhanced and the friction coefficient at the time of the starting is lowered, whereby this invention has been completed.

An object of this invention is to provide a wet type sliding apparatus comprising a radial bearing excellent in wear resistance which starts in the presence of a lubricating liquid.

Another object of this invention is to provide a wet type sliding apparatus by which the wear according to the above-mentioned friction and wear test becomes not more than 4 $\mu$m, preferably not more than 2 $\mu$m.

A still another object of this invention is to provide a process for producing a radial bearing having a thick wall.

Other objects and advantages of this invention will become apparent from the following description.

According to this invention, there is provided a wet type sliding apparatus comprising a wet type radial bearing which starts in the presence of a lubricating liquid, wherein the radial bearing has a sliding surface consisting of a resin composition comprising 10 to 45% by weight of a carbon fiber and 0.1 to 8.5% by weight of a fluorocarbon polymer, the balance being substantially an aromatic polyetherketone resin.

Also, there is provided a wet type sliding apparatus comprising a wet type radial bearing which starts in the presence of a lubricating liquid, wherein the radial bearing has a sliding surface consisting of a resin composition comprising 10 to 45% by weight of a carbon fiber, 0.1 to 30% by weight of a fluorocarbon polymer and 0.1 to 20% by weight of a graphite having an oil absorption of 70 to 500 ml per 100 g, the balance being substantially an aromatic polyetherketone resin, and the proportion of the said aromatic polyetherketone resin is not less than 35% by weight.

Also, there is further provided the above-mentioned wet type sliding apparatuses in each of which a polyarylene sulfide resin is substituted for the above aromatic polyetherketone resin. When the polyarylene sulfide resin is used, there is such an advantage that the radial bearing is obtained at a lower cost than when the aromatic polyetherketone resin is used.

According to this invention, there is further provided a process for producing a radial bearing having a thick wall which comprises subjecting to bend forming a laminated plate in which a resin composition comprising 10 to 45% by weight of a carbon fiber and 0.1 to 8.5% by weight of a fluorocarbon polymer, the balance being substantially an aromatic polyetherketone resin or a polyarylene sulfide resin is melt-bonded to the sintered surface of a backing metal having a porous metal layer formed by sintering on said surface, and thereafter heating and molding the laminated plate.

Also, there is further provided a process for producing a radial bearing having a thick wall which comprises subjecting to bend forming a laminated plate in which a resin composition comprising 10 to 45% by weight of a carbon fiber, 0.1 to 30% by weight of a fluorocarbon polymer and 0.1 to 20% by weight of a graphite having an oil absorption of 70 to 500 ml per 100 g, the balance being substantially an aromatic polyetherketone resin or a polyarylene sulfide resin, and the proportion of the said aromatic polyetherketone resin or said polyarylene sulfide resin is not less than 35% by weight, is melt-bonded to the sintered surface of a backing metal having a porous metal layer formed by sintering on said surface, and thereafter heating and molding the laminated plate.

BRIEF DESCRIPTION OF THE DRAWINGS

FIGS. 6A, 6B, 7 and 8 are views showing an example of a process for producing a half radial bearing having a thick wall to be used in a wet type sliding apparatus.

In FIGS. 6A, 6B, 7 and 8, 1 refers to a backing metal, 2 to a porous metal layer, 3 or 3a to a resin layer, 4 to a laminated plate.

In FIG. 9, 31 refers to a revolving shaft, 32 to a bearing, 33 to an oil surface and 34 to an oil tank.

DETAILED DESCRIPTION OF THE INVENTION

The polyetherketone resin is a crystalline, thermoplastic aromatic resin comprising the constituting unit represented by formula (1) alone or in combination with the constituting units represented by formulas (2), (3) and (4):

As these aromatic polyetherketone resins, polyetheretherketone (referred to hereinafter as PEEK) is particularly preferable in view of mechanical strength and heat resistance. PEEK can be produced by the method described in, for example, JP-A 54 (1979)-90,296 and it is preferable that the melt flow index as measured at 360° C. under a load of 2.16 Kg according to ASTM D1238 falls within the range of from 1 g/10 min to 5 g/10 min.

As the polyarylene sulfide resin, polyphenylene sulfide (referred to hereinafter as PPS) can be used. As PPS, there can be used a polymer whose main constituting unit consists of the recurring unit represented by general formula (5) and this PPS includes cross-linked, straight chain type and semicross-linked polymers:

(5)

As the polyfluorocarbon polymer, there can be used polytetrafluoroethylene (PTFE), polytetrafluoroethylene-hexafluoropropylene copolymer (FEP), polychlorotrifluoroethylene (PCTFE), tetrafluoroethyleneperfluoroalkyl vinyl ether copolymer (PFA) and the like, and PTFE is particularly preferable in view of low friction.

When the content of the fluorocarbon polymer is less than 0.1% by weight, no sufficient effect of the fluorocarbon polymer contained is exerted and the wear resistance becomes low. On the other hand, when the content exceeds 8.5% by weight, the fluorocarbon polymer is, when machined for use, extended in the form of whisker, the surface roughness becomes great, and it follows that the lubricating liquid film is not formed and that the friction and wear properties under wet lubrication is lowered. Therefore, the content should be 0.1 to 8.5% by weight. When the content is 0.1 to 5% by weight, the wear resistance is particularly excellent and hence it is preferable. The content is more preferably 0.5 to 2.3% by weight.

As the carbon fiber, there can be used any of the pitch-based, cellulose-based and polyacrylonitrile-based carbon fibers and the like, and the polyacrylonitrile-based carbon fiber is particularly preferable in view of friction and wear. The fiber length is preferably 0.1 to 10 mm, and usually carbon fibers having an average fiber length of about 6 mm are used.

When the carbon fiber content is less than 10% by weight, the desired mechanical strength is not obtained. On the other hand, when the content exceeds 45% by weight, the molding of the composition becomes difficult. Therefore, the carbon fiber content should be 10 to 45% by weight; however, a composition having a carbon fiber content of 25 to 35% by weight is particularly preferable because it is good in moldability and high in mechanical strength.

Each of the aromatic polyetherketone resin, fluorocarbon polymer and carbon fiber is preferably uniformly dispersed, and they are mixed by an appropriate method such as previously mixing them so that the desired content ratio is obtained by a mixer and feeding the mixture to a melt extruder, or the like.

This invention further includes a wet type sliding apparatus in which the radial bearing which starts in the presence of a lubricating liquid has a sliding surface consisting of a resin composition comprising 10 to 45% by weight of a carbon fiber, 0.1 to 30% by weight of a fluorocarbon polymer and 0.1 to 20% by weight of a graphite whose oil absorption is 70 to 500 ml per 100 g, the balance being substantially an aromatic polyetherketone resin, and the proportion of the aromatic polyetherketone resin being not less than 35% by weight.

In this invention, as described above, a polyarylene sulfide resin can be substituted for the above aromatic polyetherketone resin.

The graphite has usually an oil absorption of 50 ml per 100 g. A graphite having an oil absorption of less than 70 ml per 100 g is referred to hereinafter as the usual graphite. On the other hand, a graphite which has come to have many spaces as a result of interlaminar expansion of graphite by an expanding treatment has excellent oil absorption properties and excellent oil retention characteristics. Said graphite having an oil absorption of not less than 70 ml per 100 g is referred to hereinafter as the expanded graphite in relation to the above-mentioned usual graphite.

In the case of a sliding member containing the usual graphite, the lowering of the friction coefficient at the time of the starting cannot be so much expected. In addition, when the expanded graphite has an oil absorption exceeding 500 ml per 100 g, the particle size becomes large, and the dispersibility and mechanical strength are deteriorated when the expanded graphite is mixed with the aromatic polyetherketone resin or the polyarylene sulfide resin. Therefore, the oil absorption of the expanded graphite should be 70 ml to 500 ml per 100 g. Particularly, in view of strength, the expanded graphite having an oil absorption of 80 ml to 300 ml per 100 g is preferable, and the expanded graphite having an oil absorption of 80 ml to 150 ml per 100 g is more preferable.

When the content of the expanded graphite is less than 0.1% by weight, no effect of the expanded graphite added is obtained. On the other hand, when the content exceeds 20% by weight, molding becomes difficult. Therefore, the expanded graphite content should be 0.1 to 20% by weight. Particularly, in view of wear resistance, the expanded graphite content is preferably 1 to 10% by weight.

Furthermore, the friction coefficient at the time of the starting can be lowered by adding 0.1 to 20% by weight of a solid lubricant such as molybdenum disulfide ($MOS_2$), the usual graphite or the like. In addition, it is possible to further increase the wear resistance by adding a metal oxide or a ceramic.

Incidentally, when the amount of the aromatic polyetherketone resin or polyarylene sulfide resin used as a base material becomes less than 35% by weight, the molding becomes difficult. Therefore, the content of the aromatic polyetherketone resin or polyarylene sulfide resin should be not less than 35% by weight.

Moreover, in this invention, the above-mentioned resin composition can be molded alone to form a radial bearing, or a backing metal can be impregnated or coated with the above-mentioned resin composition to form the sliding surface of a radial bearing.

Incidentally, the radial bearing is formed into a cylindrical shape, a half cylinder shape which is obtained by dividing a cylinder to two parts, or a tilting pad which is obtained by dividing a cylinder to many parts so that the sliding surface has such a shape as to be along the circumferential surface of a shaft.

In particular, in the case of a laminated radial bearing to be used in a generator or the like, a half bearing or tilting pad bearing having a wall thickness of not less than 5 mm is applied. The large-size half bearing or the tilting pad of the tilting pad bearing can be produced by bonding a molded article of the above resin composition to the sintered surface of a flat plate-shaped backing metal having a porous metal layer formed by sintering on said surface, subjecting the resulting assembly to bend forming and thereafter heating and melting the molded article.

As explained above, according to this invention, there can be obtained a sliding member for a wet type radical bearing which sliding member is excellent in wear resistance and low in friction coefficient at the time of the starting.

DESCRIPTION OF THE PREFERRED EMBODIMENTS

Examples of this invention are explained below together with Comparative Examples.

EXAMPLES 1 to 86 AND COMPARATIVE EXAMPLES 1 to 18

A uniformly compounded resin in the form of pellet consisting of each of the compositions shown in Tables 1 to 6 was molded into a resin plate having a thickness of 5 mm by an injection molding machine.

TABLE 1

| | | | Composition | | | | Characteristics | |
|---|---|---|---|---|---|---|---|---|
| Sample No. | | Balance | CF (wt. %) | PTFE (wt. %) | Expanded graphite (wt. %) | Usual graphite (wt. %) | Tensile strength (Kgf/mm$^2$) | Friction coefficient at time of starting | Amount of wear ($\mu$m) |
| Example | 1 | PEEK | 30 | 1.0 | | | 24.0 | 0.20 | 4.7 |
| | 2 | PEEK | 30 | 2.0 | | | 23.8 | 0.18 | 3.0 |
| | 3 | PEEK | 30 | 5.0 | | | 21.2 | 0.17 | 3.3 |
| | 4 | PEEK | 30 | 8.5 | | | 19.5 | 0.13 | 5.6 |
| | 5 | PEEK | 10 | 0.1 | | | 16.8 | 0.17 | 6.2 |
| | 6 | PEEK | 10 | 0.5 | | | 16.5 | 0.15 | 5.1 |
| | 7 | PEEK | 10 | 1.0 | | | 16.3 | 0.14 | 5.2 |
| | 8 | PEEK | 10 | 8.5 | | | 15.9 | 0.12 | 5.7 |
| | 9 | PEEK | 45 | 0.5 | | | 26.1 | 0.16 | 4.7 |
| | 10 | PEEK | 45 | 8.5 | | | 20.1 | 0.12 | 4.3 |
| | 11 | PEEK | 20 | 5.0 | | | 18.5 | 0.17 | 4.2 |
| | 12 | PEEK | 30 | 2.0 | | 2.5 | | 0.16 | 4.7 |
| | 13 | PEEK | 30 | 2.0 | | 5 | | 0.17 | 5.3 |
| | 14 | PEEK | 30 | 5.0 | | 5 | | 0.15 | 6.2 |
| Comp. Ex. | 1 | PEEK | 30 | 0 | | | 24.1 | 0.24 | 11.2 |
| | 2 | PEEK | 30 | 10 | | | 17.2 | 0.13 | 10.7 |
| Comp. Ex. | 3 | PEEK | 30 | 20 | | | 12.5 | 0.13 | 10.4 |
| | 4 | PEEK | 10 | 10 | | | 12.5 | 0.12 | 11.2 |
| | 5 | PEEK | 30 | | 2.5 | | | 0.17 | 8.1 |
| | 6 | PEEK | 7 | 10 | 5 | | | 0.14 | 7.0 |

TABLE 2

| | | | Composition | | | | Characteristics | |
|---|---|---|---|---|---|---|---|---|
| Sample No. | | Balance | CF (wt. %) | PTFE (wt. %) | Expanded graphite (wt. %) | Usual graphite (wt. %) | Friction coefficient at time of starting | Amount of wear ($\mu$m) |
| Example | 15 | PEEK | 30 | 2 | 2.5 | | 0.12 | 2.0 |
| | 16 | PEEK | 30 | 5 | 2.5 | | 0.11 | 2.5 |
| | 17 | PEEK | 30 | 10 | 2.5 | | 0.11 | 5.1 |
| | 18 | PEEK | 30 | 20 | 2.5 | | 0.10 | 5.7 |
| | 19 | PEEK | 30 | 5 | 5.0 | | 0.09 | 2.9 |
| | 20 | PEEK | 30 | 10 | 5.0 | | 0.09 | 4.3 |
| | 21 | PEEK | 30 | 20 | 5.0 | | 0.09 | 5.0 |
| | 22 | PEEK | 30 | 1 | 7.5 | | 0.12 | 2.9 |
| | 23 | PEEK | 30 | 2 | 7.5 | | 0.11 | 2.5 |
| | 24 | PEEK | 30 | 5 | 7.5 | | 0.09 | 2.1 |
| | 25 | PEEK | 30 | 20 | 7.5 | | 0.09 | 4.7 |
| | 26 | PEEK | 30 | 2 | 10 | | 0.08 | 2.8 |
| | 27 | PEEK | 30 | 15 | 10 | | 0.07 | 5.1 |
| | 28 | PEEK | 30 | 25 | 10 | | 0.07 | 6.1 |

TABLE 3

| | Sample No. | Balance | Composition | | | | Characteristics | |
|---|---|---|---|---|---|---|---|---|
| | | | CF (wt. %) | PTFE (wt. %) | Expanded graphite (wt. %) | Usual graphite (wt. %) | Friction coefficient at time of starting | Amount of wear (μm) |
| Example | 29 | PEEK | 10 | 0.1 | 5.0 | | 0.12 | 6.0 |
| | 30 | PEEK | 10 | 2 | 5.0 | | 0.10 | 5.2 |
| | 31 | PEEK | 10 | 10 | 5.0 | | 0.09 | 5.5 |
| | 32 | PEEK | 20 | 2 | 7.5 | | 0.09 | 4.2 |
| | 33 | PEEK | 20 | 10 | 7.5 | | 0.07 | 4.7 |
| | 34 | PEEK | 45 | 2 | 5.0 | | 0.11 | 4.3 |
| | 35 | PEEK | 45 | 10 | 5.0 | | 0.09 | 4.1 |
| | 36 | PEEK | 30 | 2 | 7.5 | 2.5 | 0.11 | 2.2 |
| | 37 | PEEK | 30 | 2 | 2.5 | 1) 2.5 | 0.12 | 2.1 |
| | 38 | PEEK | 10 | 0.1 | 0.1 | | 0.14 | 6.0 |
| | 39 | PEEK | 30 | 5 | 2) 5.0 | | 0.09 | 3.1 |
| | 40 | PEEK | 30 | 15 | 1.0 | | 0.10 | 5.4 |
| | 41 | PEEK | 30 | 20 | 15.0 | | 0.09 | 6.0 |
| | 42 | PEEK | 30 | 5 | 3) 5.0 | | 0.10 | 3.3 |
| | 43 | PEEK | 30 | 5 | 4) 5.0 | | 0.10 | 3.4 |
| Comp. Ex. | 7 | PEEK | 20 | 30 | 20 | | — | — |
| | 8 | PEEK | 40 | 20 | 20 | | — | — |
| | 9 | PEEK | 30 | 20 | 15 | 10 | — | — |

1) $MoS_2$
2) Oil absorption of 150 ml per 100 g
3) Oil absorption of 300 ml per 100 g
4) Oil absorption of 500 ml per 100 g

TABLE 4

| | Sample No. | Balance | Composition | | | | Characteristics | | |
|---|---|---|---|---|---|---|---|---|---|
| | | | CF (wt. %) | PTFE (wt. %) | Expanded graphite (wt. %) | Usual graphite (wt. %) | Tensile strength (Kgf/mm$^2$) | Friction coefficient at time of starting | Amount of wear (μm) |
| Example | 44 | PPS | 30 | 1.0 | | | 24.0 | 0.20 | 4.7 |
| | 45 | PPS | 30 | 2.0 | | | 13.2 | 0.17 | 4.2 |
| | 46 | PPS | 30 | 5.0 | | | 12.8 | 0.17 | 4.5 |
| | 47 | PPS | 30 | 8.5 | | | 11.2 | 0.16 | 9.6 |
| | 48 | PPS | 10 | 0.1 | | | 11.5 | 0.20 | 10.5 |
| | 49 | PPS | 10 | 0.5 | | | 11.0 | 0.19 | 9.1 |
| | 50 | PPS | 10 | 1.0 | | | 10.2 | 0.17 | 8.5 |
| | 51 | PPS | 10 | 8.5 | | | 8.1 | 0.18 | 9.9 |
| | 52 | PPS | 45 | 0.5 | | | 15.3 | 0.15 | 8.6 |
| | 53 | PPS | 45 | 8.5 | | | 11.9 | 0.14 | 7.6 |
| | 54 | PPS | 20 | 5.0 | | | 12.0 | 0.14 | 7.9 |
| | 55 | PPS | 30 | 2.0 | | 2.5 | | 0.19 | 8.5 |
| | 56 | PPS | 30 | 2.0 | | 5 | | 0.19 | 9.6 |
| | 57 | PPS | 30 | 5.0 | | 5 | | 0.18 | 11.0 |
| Comp. Ex. | 10 | PPS | 30 | 0 | | | 13.5 | 0.27 | 18.5 |
| | 11 | PPS | 30 | 10 | | | 9.9 | 0.17 | 14.7 |
| | 12 | PPS | 30 | 20 | | | 7.0 | 0.16 | 16.1 |
| | 13 | PPS | 10 | 10 | | | 7.4 | 0.21 | 13.9 |
| | 14 | PPS | 30 | | 2.5 | | | 0.22 | 14.4 |
| | 15 | PPS | 7 | 10 | 5 | | | 0.16 | 15.2 |

TABLE 5

| | Sample No. | Balance | Composition | | | | Characteristics | |
|---|---|---|---|---|---|---|---|---|
| | | | CF (wt. %) | PTFE (wt. %) | Expanded graphite (wt. %) | Usual graphite (wt. %) | Friction coefficient at time of starting | Amount of wear (μm) |
| Example | 58 | PPS | 30 | 2 | 2.5 | | 0.16 | 3.7 |
| | 59 | PPS | 30 | 5 | 2.5 | | 0.15 | 4.2 |

TABLE 5-continued

| | | Composition | | | | Characteristics | |
|---|---|---|---|---|---|---|---|
| Sample No. | Balance | CF (wt. %) | PTFE (wt. %) | Expanded graphite (wt. %) | Usual graphite (wt. %) | Friction coefficient at time of starting | Amount of wear (μm) |
| 60 | PPS | 30 | 10 | 2.5 | | 0.13 | 9.3 |
| 61 | PPS | 30 | 20 | 2.5 | | 0.13 | 10.2 |
| 62 | PPS | 30 | 5 | 5.0 | | 0.12 | 4.5 |
| 63 | PPS | 30 | 10 | 5.0 | | 0.11 | 7.6 |
| 64 | PPS | 30 | 20 | 5.0 | | 0.11 | 8.8 |
| 65 | PPS | 30 | 1 | 7.5 | | 0.14 | 4.8 |
| 66 | PPS | 30 | 2 | 7.5 | | 0.13 | 3.4 |
| 67 | PPS | 30 | 5 | 7.5 | | 0.10 | 3.7 |
| 68 | PPS | 30 | 20 | 7.5 | | 0.10 | 8.3 |
| 69 | PPS | 30 | 2 | 10 | | 0.10 | 3.4 |
| 70 | PPS | 30 | 15 | 10 | | 0.08 | 7.1 |
| 71 | PPS | 30 | 25 | 10 | | 0.08 | 9.3 |

TABLE 6

| | Sample No. | Balance | CF (wt. %) | PTFE (wt. %) | Expanded graphite (wt. %) | Usual graphite (wt. %) | Friction coefficient at time of starting | Amount of wear (μm) |
|---|---|---|---|---|---|---|---|---|
| Example | 72 | PPS | 10 | 0.1 | 5.0 | | 0.15 | 10.2 |
| | 73 | PPS | 10 | 2 | 5.0 | | 0.13 | 8.0 |
| | 74 | PPS | 10 | 10 | 5.0 | | 0.10 | 8.8 |
| | 75 | PPS | 20 | 2 | 7.5 | | 0.10 | 7.6 |
| | 76 | PPS | 20 | 10 | 7.5 | | 0.09 | 8.2 |
| | 77 | PPS | 45 | 2 | 5.0 | | 0.12 | 7.6 |
| | 78 | PPS | 45 | 10 | 5.o | | 0.10 | 6.8 |
| | 79 | PPS | 30 | 2 | 7.5 | 2.5 | 0.13 | 3.1 |
| | 80 | PPS | 30 | 2 | 2.5 | 1) 2.5 | 0.14 | 3.2 |
| | 81 | PPS | 10 | 0.1 | 0.1 | | 0.18 | 10.5 |
| | 82 | PPS | 30 | 5 | 2) 5.0 | | 0.10 | 5.1 |
| | 83 | PPS | 30 | 15 | 1.0 | | 0.09 | 9.3 |
| | 84 | PPS | 30 | 20 | 15.0 | | 0.08 | 10.0 |
| | 85 | PPS | 30 | 5 | 3) 5.0 | | 0.11 | 5.9 |
| | 86 | PPS | 30 | 5 | 4) 5.0 | | 0.10 | 6.2 |
| Comp. Ex. | 16 | PPS | 20 | 30 | 20 | | — | — |
| | 17 | PPS | 40 | 20 | 20 | | — | — |
| | 18 | PPS | 36 | 20 | 15 | 10 | — | — |

1) $MoS_2$
2) Oil absorption of 150 ml per 100 g
3) Oil absorption of 300 ml per 100 g
4) Oil absorption of 500 ml per 100 g In the Examples and the Comparative Examples, PEEK was used as the aromatic polyetherketone resin and PPS was used as the polyarylene sulfide resin. As the PEEK, there was used PEEK 450 G (a trade name of ICI in U.K., melt flow index: 3.1 g/10 min). As the PPS, there was used Ryton P-4 (a trade name of Phillips) was used.

As the fluorocarbon polymer, TLP-10 (a trade name of Mitsui Dupont-Fluorochemical Co., Ltd. for PTFE) was used.

As the carbon fiber (in Tables 1 to 6, referred to as CF), Torayca MDL (a trade name of TORAY INDUSTRIES INC.) was used.

As the expanded graphite, there was used one manufactured by Nippon Graphite Industry Co., Ltd. The oil absorption was 80 ml/100 g, provided that it was 150 ml/100 g in Examples 39 and 82, 300 ml/100 g in Examples 42 and 85, and 500 ml/100 g in Examples 43 and 86.

On the other hand, the usual graphite added in the Comparative Examples was a graphite having an oil absorption of 50 ml/100 g manufactured by Nippon Graphite Industry Co., Ltd.

Figure 1:
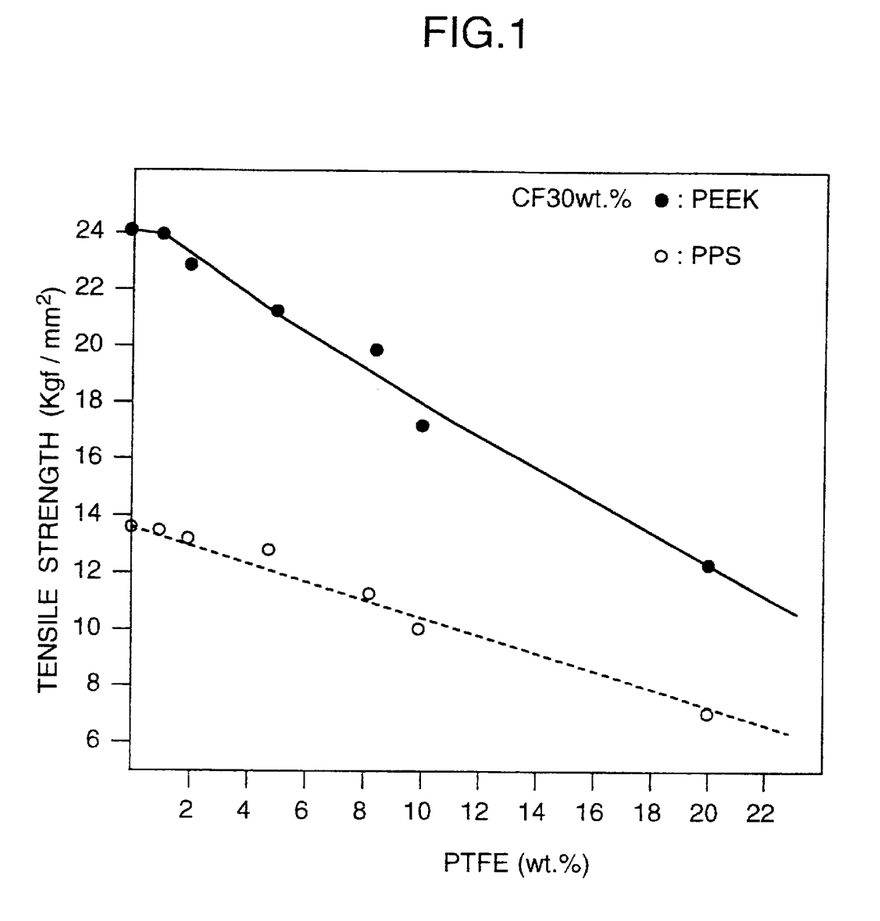
FIG. 1 is a graph showing a relation between the PTFE content in the resin composition constituting the resin plate used in the Examples or the like and the tensile strength of the resin plate.

The resin plates of Examples 1 to 11 and Comparative Examples 1 to 4 in which PEEK was used as a base material and the resin plates of Examples 44 to 54 and Comparative Examples 10 to 13 in which PPS was used as a base material were subjected to a tensile test. The results obtained are shown in Table 1 and Table 4, respectively. Also, among these Examples and Comparative Examples, in those where 30% by weight of the carbon fiber (CF) was contained, the influence of the PTFE content on tensile strength was evaluated and the results thereof are shown in FIG. 1, from which it was found that the tensile strength was lowered as the PTFE content increased.

Subsequently, a copper alloy powder was spread in a thickness of 0.3 mm on a copper-plated steel plate having a thickness of 1 mm and sintered to form a porous metal layer. The above-mentioned resin plate was put on this porous metal layer heated to 330–400° C. and the resulting assembly was pressure-bonded by a press to impregnate and cover the porous metal layer with the resin. Subsequently, the plate thus obtained was subjected to cutting and forming to be shaped into a cylinder having an outer diameter of 23 mm, an inner diameter of 20 mm and a width of 20 mm, thereby obtaining a test sample for each of the Examples and the Comparative Examples.

The test samples thus obtained for the Examples and the Comparative Examples were subjected to a friction and wear test under the conditions shown in Table 7 using a cylinder type friction and wear testing machine. In the test, a counter member was rotated for 30 seconds and rested for 300 seconds in the presence of a lubricating oil and this cycle was repeated 15 times, in which the friction coefficient at the time of the starting was measured on the last 5 of the 15 cycles. The average of the 5 values obtained was taken as a friction coefficient at the time of the starting. Moreover, the wear was determined by measuring the thickness of the test sample before and after the test and calculating the difference between the two thicknesses. The test results obtained are shown together in Tables 1 to 6.

TABLE 7

| Test conditions | Dimension | Unit |
|---|---|---|
| Test sample size | φ23 × φ20 × 20L | mm |
| Number of revolution | 1900 | rpm |
| Peripheral speed | 2 | m/sec |
| Pressure | 20 | MPa |
| Lubricating oil | VG46 | — |
| Lubricating oil temp. | 55 | °C. |
| Lubricating method | Lubricating oil dropping 8 | ml/min |
| Counter member | | |
| Material | S45C | — |
| Roughness | 1.0 | Rmax μm |
| Hardness | 180–220 | Hv10 |

Figure 2:
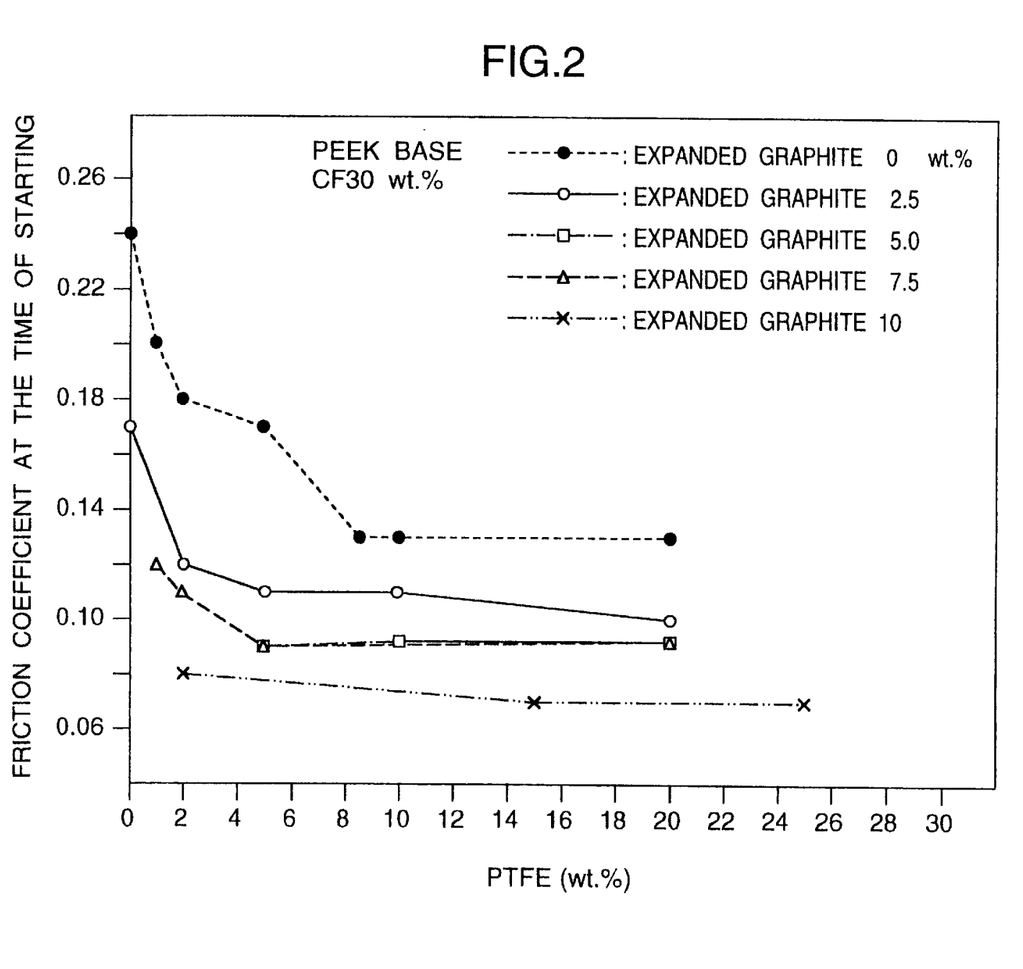
FIG. 2 is a graph showing a relation between the PTFE content of a sliding test sample in which PEEK is used as a base material and the friction coefficient at the time of the starting.
Figure 3:
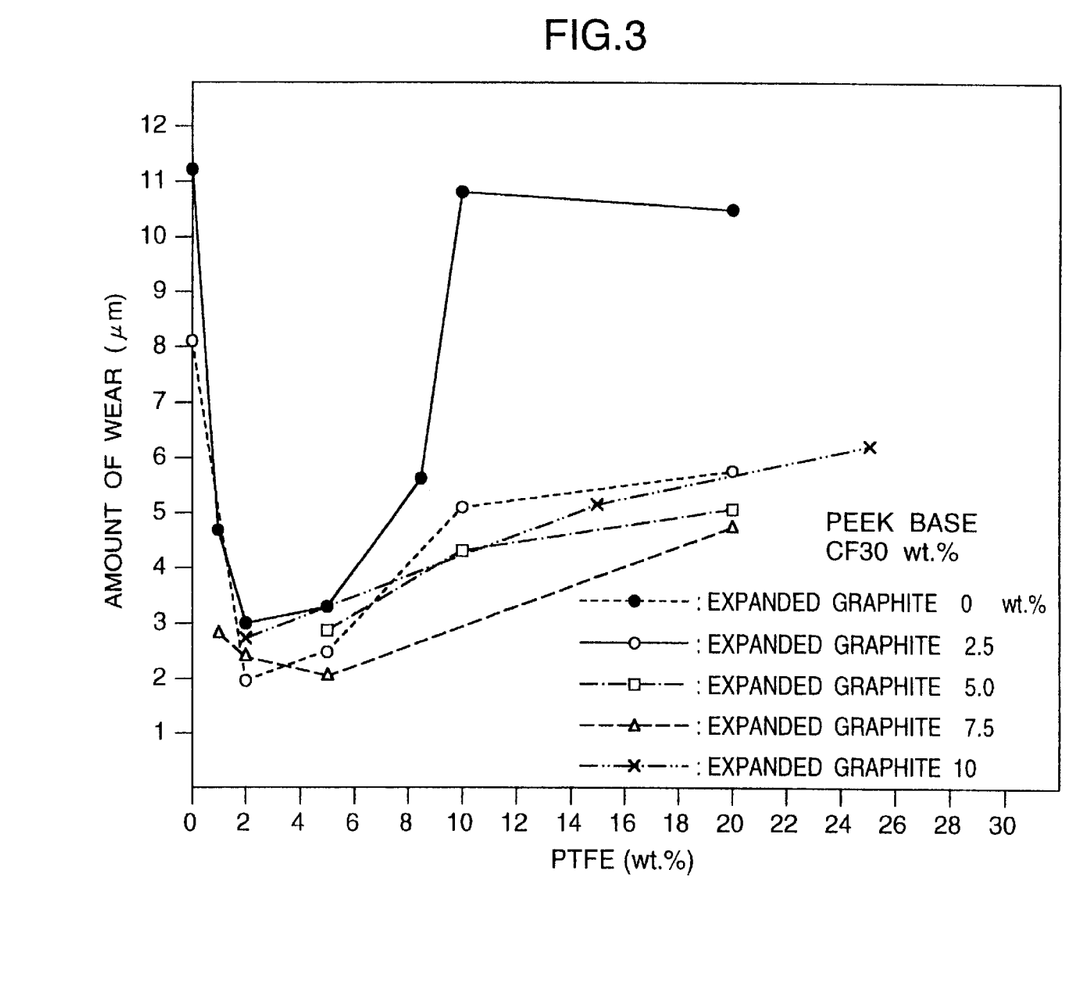
FIG. 3 is a graph showing a relation between the PTFE content of said sample and the wear of the sliding test sample.

As to the test results shown in Tables 1 to 3 in which PEEK was used as the base material, the influence of the PTFE content on the friction coefficient at the time of the starting and the wear in the Examples and Comparative Examples in which the carbon fiber (CF) content was 30% by weight is shown in FIGS. 2 and 3.

FIG. 2 shows the influence of the PTFE content on the friction coefficient at the time of the starting and in Examples 1 to 4 and Comparative Examples 1 to 3, in which no expanded graphite were contained, the fiction coefficient at the time of the starting was as high as 0.24 when the PTFE content was 0% by weight (Comparative Example 1) and it was gradually lowered to 0.13 as the PTFE content increased, and became a substantially constant value when the PTFE content was not less than 8% by weight. It was confirmed therefrom that there was obtained such a result as to be sufficiently good as a sliding member with respect to the friction coefficient at the time of the starting. Also, substantially no influence of the carbon fiber content on the friction coefficient at the time of the starting was seen.

Furthermore, in Examples 15 to 18 in which the expanded graphite having an oil absorption of 80 ml/100 g was contained in a proportion of 2.5% by weight, the results were obtained that the friction coefficient at the time of the starting was decreased until a PTFE content became 5% by weight and a substantially constant value of 0.11 was shown when the PTFE content exceeded 5% by weight. In the Examples 15 to 28 in which the expanded graphite contents were 2.5, 5.0, 7.5 and 10, respectively, the friction coefficient at the time of the starting was lowered as the expanded graphite content increased. Also, the PTFE content was decreased so that the friction coefficient at the time of the starting became a low constant value as the expanded graphite content became larger. Accordingly, when the expanded graphite content reached 10% by weight as shown in Example 26, a friction coefficient at the time of the starting of 0.08 was shown at a PTFE content of 2% by weight. From the above results, it was seen from the above that the expanded graphite had an effect of lowering the friction coefficient at the time of the starting, and also, this effect was further increased by using the expanded graphite in combination with PTFE.

Example 36 and Example 37 are examples of addition of a solid lubricant to Example 23 and Example 15, respectively, and in each of them, the friction coefficient at the time of the starting was enhanced.

FIG. 3 shows the influence of the PTFE content on the wear. In Examples 1 to 4 and Comparative Examples 1 to 3, in which no expanded graphite was contained, the wear was rapidly reduced as the PTFE content was increased from Comparative Example 1 in which no PTFE was contained and the wear was 11.2 μm, and the lowest wear value was shown at a PTFE content of 2% by weight in Example 2. And the wear increased gradually until a PTFE content of that content of 8.5% by weight (Example 4) and increased rapidly between 8.5% by weight and 10% by weight (Comparative Example 2). At a PTFE content of more than 10% by weight, a substantially constant wear became shown. In addition, from the comparison of Examples 4, 8 and 10, there was seen such a tendency that the wear decreased as the carbon fiber (CF) content increased.

In Examples 15 to 18 in which 2.5% by weight of the expanded graphite having an oil absorption of 80 ml/100 g was contained, the wear decreased in each case, as compared with Examples 2 and 3 and Comparative Examples 2 and 3 in which the PTFE was contained in the same amount but no expanded graphite was contained, and an effect of the expanded graphite contained was obtained.

Moreover, comparing Example 14 in which the usual graphite having an oil absorption of 50 ml per 100 g was used, with Examples 19, 39, 42 and 43 in which the expanded graphite having oil absorptions were 80, 150, 300 and 500 ml per 100 g, respectively, an effect of the expanded graphite contained was confirmed as to both wear and friction coefficient at the time of the starting.

Comparing Examples 20, 31 and 35 with Comparative Example 6 as to the carbon fiber, it was seen that the friction and wear characteristics were enhanced by adding at least 10% by weight of the carbon fiber.

Furthermore, Comparative Examples 7 to 9 were examples in which the total amount of the carbon fiber, the PTFE, the expanded graphite and the solid lubricant exceeded 65% by weight, and the molding was difficult and test samples were unable to be obtained.

From the test results shown in Tables 4 to 6 in which PPS was used as the base material, it was understood that substantially the same results were obtained as in the Examples and Comparative Examples in which PEEK was used as the base material. In the same manner as in FIGS. 2 and 3, the influence of the PTFE content on friction coefficient at the time of the starting and wear was shown collectively in FIGS. 4 and 5.

Figure 4:
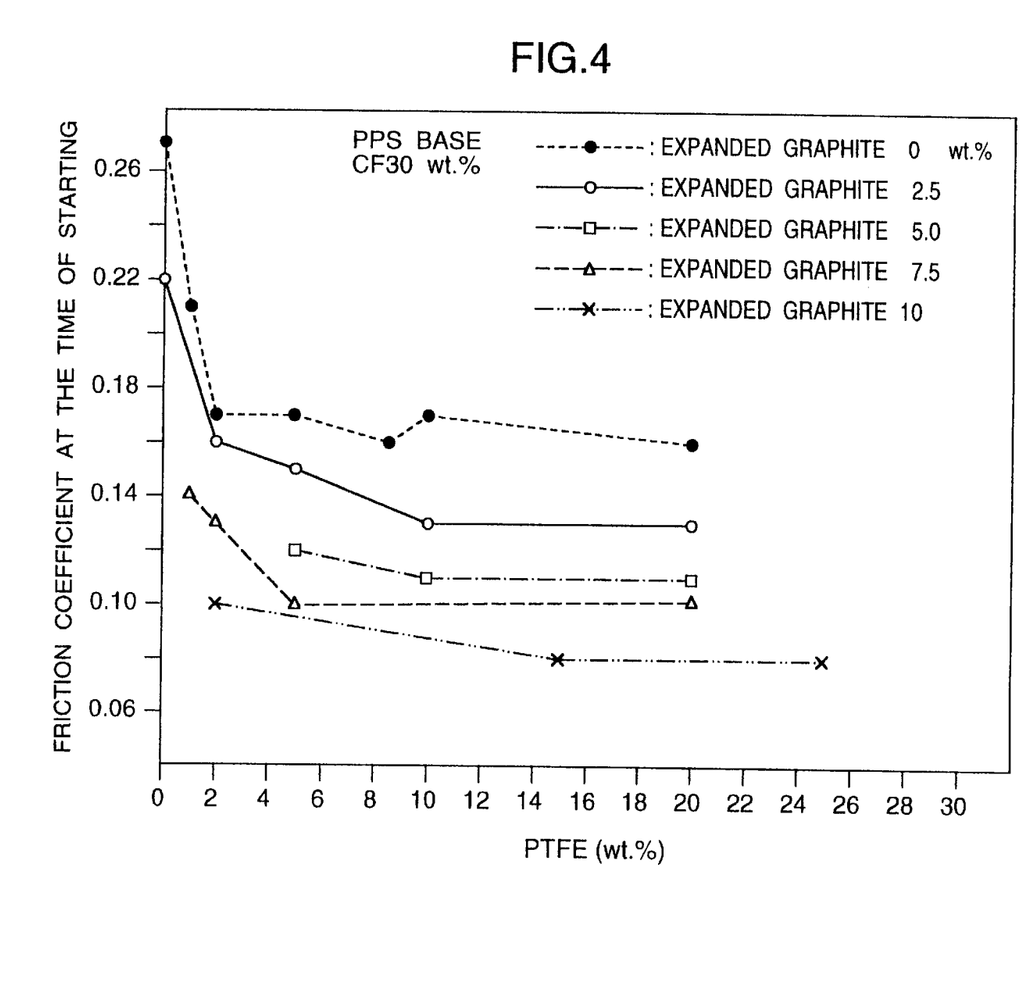
FIG. 4 is a graph shown a relation between the PTFE content of a sliding test sample in which PPS is used as a base material and the friction coefficient at the time of the starting.

According to FIG. 4, Examples 44 to 47 and Comparative Examples 10 to 12 in which the expanded graphite was not contained showed that the friction coefficient at the time of the starting was as high as 0.27 in Comparative Example 10 in which the PTFE was not contained and as the PTFE content increased, the friction coefficient at the time of the starting decreased gradually to 0.16. When the PTFE content was more than 8% by weight, the friction coefficient at the time of the starting became a substantially constant value. From the above results, it was seen that a sliding member having a sufficiently good friction coefficient at the time of the starting was obtained.

In Examples 58 to 61 in which the expanded graphite having an oil absorption of 80 ml/100 g was contained in a proportion of 2.5% by weight, such results were obtained that the friction coefficient at the time of the starting became low until the PTFE content became 5% by weight, and when the PTFE content exceeded 10% by weight the friction coefficient at the time of the starting became a substantially constant value of 0.13. In addition, from Examples 58 to 71 in which the content of the expanded graphite was adjusted to 2.5, 5.0, 7.5 and 10, respectively, it was seen that the friction coefficient at the time of the starting was lowered as the content of the expanded graphite increased, and Example 70 shows that the friction coefficient at the time of the starting was 0.08. From the above results, it was seen that the expanded graphite had an effect of lowering the friction coefficient at the time of the starting and when it was used in combination with PTFE, the said effect was further increased.

Example 79 and Example 80 were examples of addition of a solid lubricant to Example 66 and Example 58, respectively, and the friction coefficient at the time of the starting was enhanced.

Figure 5:
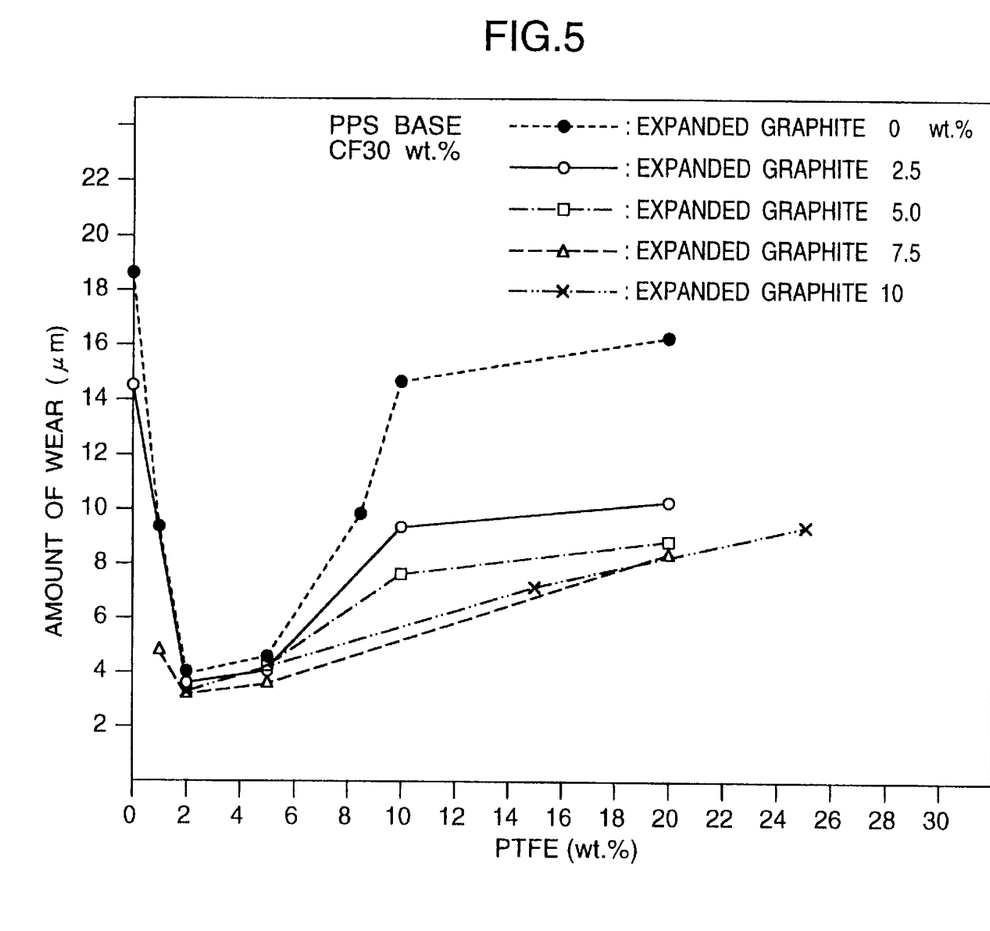
FIG. 5 is a graph showing a relation between the PTFE content of said sample and the wear of the sample.

According to FIG. 5, Examples 44 to 47 and Comparative Examples 10 to 12 in which no expanded graphite was contained showed that the wear rapidly decreased from 18.5 μm in Comparative Example 10 in which no PTFE was contained as the PTFE content increased, and that the wear became the lowest value in Example 45 in which 2% by weight of PTFE was contained. In addition, the wear increased gradually until the PTFE content became 8.5% by weight (Example 47) and then rapidly increased between the PTFE contents of 8.5% by weight and 10% by weight (Comparative Example 11). When the PTFE content was more than 10% by weight, a substantially constant wear was shown.

Furthermore, in Examples 58 to 61 in which the expanded graphite having an oil absorption of 80 ml/100 g was contained in a proportion of 2.5% by weight, the wear was decreased as compared with Examples 45 and 46 and Comparative Examples 11 and 12 in which the PTFE was contained in the same amount, and an effect of the expanded graphite contained was obtained.

Comparative Examples 16 to 18 are examples in which the total amount of the carbon fiber, the PTFE, the expanded graphite and the solid lubricant exceeded 65% by weight and showed that the molding was difficult and the test sample was unable to be obtained.

Figure 6:
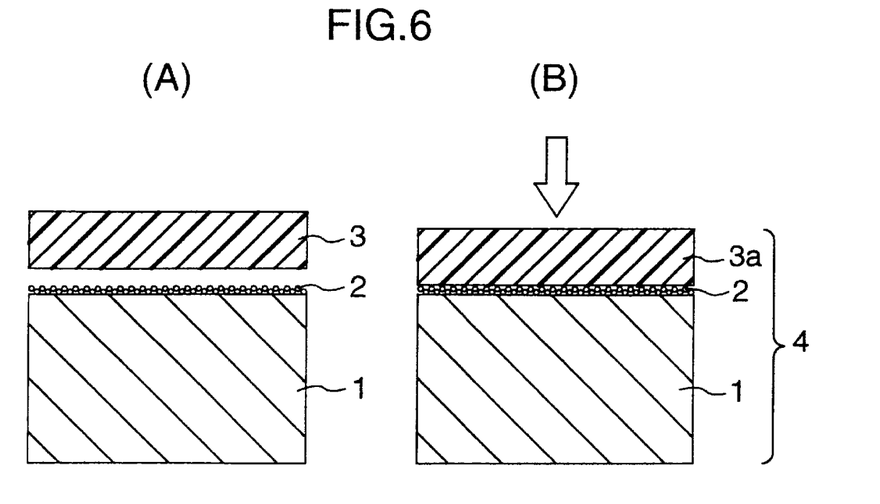
FIGS. 6A and 6B are partial sectional views showing, respectively, the states before and after bonding a resin plate of a sliding member to a backing metal having a porous metal layer formed by sintering on its surface.
Figure 7:
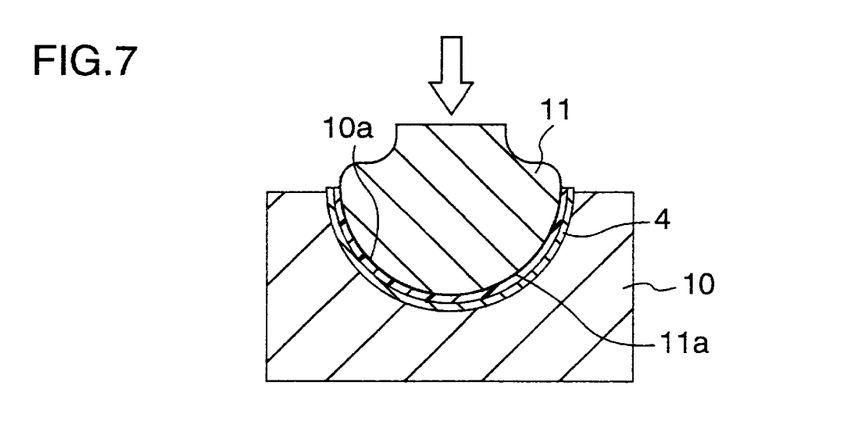
FIG. 7 is a sectional view showing the state in which a laminated plate is being subjected to bend forming.
Figure 8:
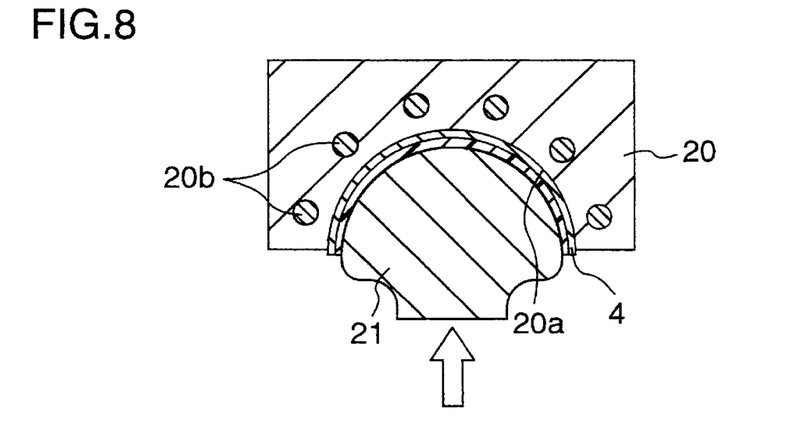
FIG. 8 is another sectional view showing the state in which a laminated plate is being subjected to bend forming.
Figure 9:
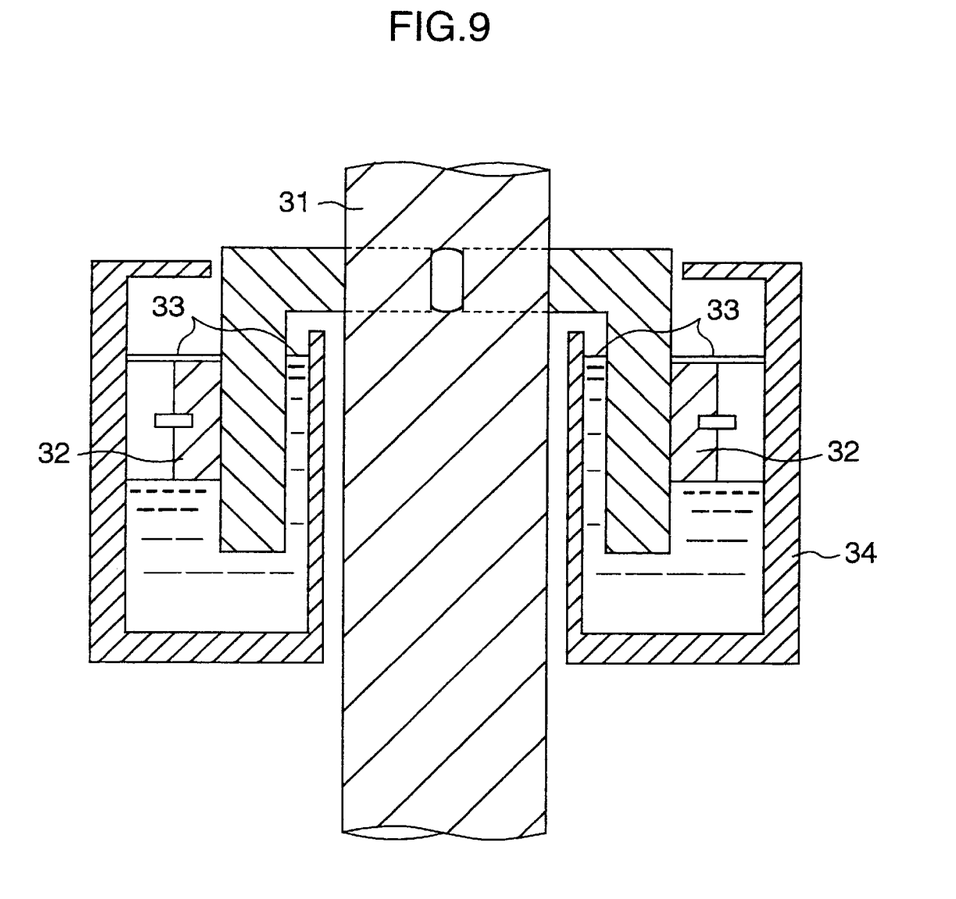
FIG. 9 illustrates the sliding portion of a vertical pump as an example of the wet type sliding apparatus of this invention comprising a radial bearing which starts in the presence of a lubricating liquid.

Next, an example of the process for producing a half cylinder having a thick wall to be incorporated into a generator or the like in which the sliding member shown in each of the above-mentioned Examples was used is explained based on FIGS. 6 to 8.

As shown in the test samples used in the Examples and the Comparative Examples, when the thickness of the steel plate which was the backing metal and the thickness of the resin plate were small, a radial bearing can be produced by curving the said laminated plate to a cylinder or half cylinder shape. However, in the case of a large-sized radial bearing having the thick wall, the resin partially came out from the porous metal layer in some cases when the plate was curved. A process for producing such a radial bearing having a thick wall is explained below using as an example a half bearing in which a steel plate having a thickness of 10 mm was the backing metal.

As shown in FIG. 6A, the backing metal 1 was composed of a copper-plated steel plate having a thickness of 10 mm, and a copper alloy powder spreaded on the upper surface thereof was sintered to form a porous metal layer 2 having a thickness of 1 mm. The resin plate 3 is a plate having a thickness of 5 mm formed by molding the resin composition of one of the above-mentioned Examples. The porous metal layer 2 was heated to the resin's melting temperature of 330 to 400° C. and in this state the above-mentioned resin plate was put on the porous metal layer, after which the resulting assembly was pressure-bonded by a press to sufficiently impregnate the porous metal layer with the resin, thereby obtaining a laminated plate 4 in which the resin layer 3a was melt-bonded on the backing layer 1 (see FIG. 6B).

As shown in FIG. 7, dies 10 and a punch 11 were used for the bend forming of the laminated plate 4. On the dies 10 was provided a semicircular concavity 10a of 230 mm in diameter corresponding to the outer diameter of the half bearing, and on the tip of the punch 11 was provided a convexity 11a of 200 mm in diameter corresponding to the inner diameter of the half bearing. Between the dies 10 and the punch 11, a laminated plate 4 was placed and the punch 11 was allowed to descend to curve the laminated plate 4, thereby shaping the plate to a half cylinder. In this case, each of the spaces among the copper alloy powder particles of the porous metal layer 2 was filled with the resin with which the porous metal layer had been impregnated, so that the bend forming was carried out without crushing the each copper alloy powder particle. Incidentally, with the bend forming, a residual stress accompanying a strong compression took place in the resin layer 3a and the resin partially came out from the porous metal layer.

Subsequently, as shown in FIG. 8, the curved laminated plate 4 was re-heated by a heating jig 20. On the heating jig 20 was provided a heating concavity 20a in the shape of a half cylinder of 230 mm in diameter so that concavity accommodated the outer periphery of the curved laminated plate 4. In addition, in the interior thereof, heaters 20b were arranged. The head of the pressing jig 21 was shaped into a convexity of 200 mm in diameter for pressing and keeping the inner periphery of the curved laminated plate 4. And in the state that the curved laminated plate 4 was placed on the tip of the pressing jig 21, the curved laminated plate was inserted into the heated concavity 20a and kept in intimate contact therewith, after which the resin layer 3a was heated to 330–400° C. to be melted again. By this method, the resin's coming out from the porous metal layer which had been caused in the resin layer 3a was recovered and the residual stress was removed. Thus, even such a radial bearing having a thick wall that the resin partially came out from the porous metal layer to the resin layer 3a as the laminated plate 4 was curved can be easily produced. Incidentally, this production process can be applied to not only the production of a half bearing but also the production of a cylindrical bearing and a tilting pad formed by dividing a cylinder to many parts such as a tilting pad journal bearing.

Incidentally, in the above-mentioned process for producing a bearing, the laminated plate 4 in which the resin layer 3a was melt-bonded to the backing metal 1 was subjected to bend forming and thereafter re-heated. However, it is not always necessary to carry out these steps successively, and the bend forming can be effected at the re-heating temperature or can be effected in the melt-bonding step to omit the re-heating step.

In addition, as the heating method, there may be adopted an appropriate means, for example, a heating means such as a bar-shaped heater or the like; a high frequency heating means; or the like.

Furthermore, in the above-mentioned process for producing a bearing, the method of forming the porous metal layer 2 on the backing metal 1 has been explained above referring to an example of sintering the spreaded copper alloy powder, but the porous metal layer 2 may be formed by a flame-spraying method, or the like. Moreover, as to the formation of the laminated plate 4, an example of pressure-bonding the resin plate 3 to the backing metal 1 by a press has been explained above; however, the pressure-bonding by a press may be replaced by pressure-bonding by a roll.

In addition, the method of curving the laminated plate 4 has been explained above referring to a method using the dies 10 and the punch 11; however, the curving method is not limited thereto and an appropriate method, for example, the curving by a roll or the like can be adopted. Moreover, the bend forming may be not only a cold bend forming but also a hot bend forming in which the laminated plate 4 was heated at a temperature not lower than the glass transition point of the resin.

Furthermore, in the Examples shown in FIGS. 7 and 8, it was possible to place a cushion material such as a copper foil, an aluminum foil or the like between the laminated plate 4 and the punch 11, or to form a slit on the pressing surface of the punch 11 or the pressing jig 21, or to change the curvature of each jig.

What is claimed is:

1. A wet type sliding apparatus comprising a lubricating liquid and a wet type radial bearing which starts in the presence of a lubricating liquid, wherein the radial bearing has a sliding surface consisting of a resin composition consisting essentially of 10 to 45% by weight of a carbon fiber and 0.5 to 2.3% by weight of a fluorocarbon polymer, the balance being substantially an aromatic polyetherketone resin.

2. The wet type sliding apparatus according to claim 1, wherein the resin composition includes 0.1 to 20% by weight of a solid lubricant and the proportion of the above aromatic polyetherketone resin is not less than 35% by weight.

3. A wet type sliding apparatus comprising a lubricating liquid and a wet type radial bearing which starts in the presence of a lubricating liquid, wherein the radial bearing has a sliding surface consisting of a resin composition consisting essentially of 10 to 45% by weight of a carbon fiber, 0.1 to 30% by weight of a fluorocarbon polymer and 0.1 to 20% by weight of a graphite having an oil absorption of 70 to 500 ml per 100 g, the balance being substantially an aromatic polyetherketone resin, and the proportion of the said aromatic polyetherketone resin is not less than 35% by weight.

4. The wet type sliding apparatus according to claim 3, wherein the resin composition includes 0.1 to 20% by weight of a solid lubricant and the proportion of the above aromatic polyetherketone resin is not less than 35% by weight.

5. A wet type sliding apparatus comprising a lubricating liquid and a wet type radial bearing which starts in the presence of a lubricating liquid, wherein the radial bearing has a sliding surface consisting of a resin composition consisting essentially of 10 to 45% by weight of a carbon fiber and 0.1 to 8.5% by weight of a fluorocarbon polymer, the balance being substantially a polyarylene sulfide resin.

6. The wet type sliding apparatus according to claim 5, wherein the resin composition includes 0.1 to 20% by weight of a solid lubricant and the proportion of the above polyarylene sulfide is not less than 35% by weight.

7. A wet type sliding apparatus comprising a lubricating liquid and a wet type radial bearing which starts in the presence of a lubricating liquid, wherein the radial bearing has a sliding surface consisting of a resin composition consisting essentially of 10 to 45% by weight of a carbon fiber, 0.1 to 30% by weight of a fluorocarbon polymer and 0.1 to 20% by weight of a graphite having an oil absorption of 70 to 500 ml per 100 g, the balance being substantially a polyarylene sulfide resin, and the proportion of the said polyarylene sulfide resin is not less than 35% by weight.

8. The wet type sliding apparatus according to claim 7, wherein the resin composition includes 0.1 to 20% by weight of a solid lubricant and the proportion of the above polyarylene sulfide resin is not less than 35% by weight.

9. The wet type sliding apparatus according to claim 1, wherein the radial bearing consists of a backing metal coated thereon the resin composition recited in claim 1.

10. The wet type sliding apparatus according to claim 3, wherein the radial bearing consists of a backing metal coated thereon the resin composition recited in claim 3.

11. The wet type sliding apparatus according to claim 5, wherein the radial bearing consists of a backing metal coated thereon the resin composition according to claim 5.

12. The wet type sliding apparatus according to claim 7, wherein the radial bearing consists of a backing metal coated thereon the resin composition according to claim 7.

13. The wet type sliding apparatus according to claim 1, wherein the radial bearing is a radial bearing having a thick wall formed by subjecting to bend forming a laminated plate in which the resin composition recited in claim 1 is melt-bonded onto the sintered surface of a flat plate-shaped backing metal having a porous metal layer formed by sintering on said surface, and thereafter heating and molding the laminated plate.

14. The wet type sliding apparatus according to claim 3, wherein the radial bearing is a radial bearing having a thick wall formed by subjecting to bend forming a laminated plate in which the resin composition according to claim 3 is melt-bonded onto the sintered surface of a flat plate-shaped backing metal having a porous metal layer formed by sintering on said surface, and thereafter heating and molding the laminated plate.

15. The wet type sliding apparatus according to claim 5, wherein the radial bearing is a radial bearing having a thick wall formed by subjecting to bend forming a laminated plate in which the resin composition according to claim 5 is melt-bonded onto the sintered surface of a flat plate-shaped backing metal having a porous metal layer formed by sintering on the said surface, and thereafter melting and molding the laminated plate.

16. The wet type sliding apparatus according to claim 7, wherein the radial bearing is a radial bearing having a thick wall formed by subjecting to bend forming a laminated plate in which the resin composition according to claim 7 is melt-bonded onto the sintered surface of a flat plate-shaped backing metal having a porous metal layer formed by sintering on the said surface, and thereafter melting and molding the laminated plate.

17. A process for producing a radial bearing having a thick wall which comprises subjecting to bend forming a laminated plate in which the resin composition according to claim 1 is melt-bonded onto the sintered surface of a flat plate-shaped backing metal having a porous metal layer formed by sintering on the said surface, and thereafter melting and molding the laminated plate.

18. A process for producing a radial bearing having a thick wall which comprises subjecting to bend forming a laminated plate in which the resin composition according to claim 3 is melt-bonded onto the sintered surface of a flat plate-shaped backing metal having a porous metal layer formed by sintering on the said surface, and thereafter melting and molding the laminated plate.

19. A process for producing a radial bearing having a thick wall which comprises subjecting to bend forming a laminated plate in which the resin composition according to claim 5 is melt-bonded onto the sintered surface of a flat plate-shaped backing metal having a porous metal layer formed by sintering on the said surface, and thereafter melting and molding the laminated plate.

20. A process for producing a radial bearing having a thick wall which comprises subjecting to bend forming a laminated plate in which the resin composition according to claim 7 is melt-bonded onto the sintered surface of a flat plate-shaped backing metal having a porous metal layer formed by sintering on the said surface, and thereafter melting and molding the laminated plate.

* * * * *